US008515421B2

(12) United States Patent
Shaheen et al.

(10) Patent No.: US 8,515,421 B2
(45) Date of Patent: Aug. 20, 2013

(54) IMS ENABLED ATTACH PROCEDURE FOR LTE

(75) Inventors: Kamel M. Shaheen, King of Prussia, PA (US); Peter Shaomin Wang, E. Setauket, NY (US); Narayan Parappil Menon, Syosset, NY (US); Ulises Olvera-Hernandez, Kirkland (CA); Maged M. Zaki, Pierrefonds (CA); Shamim Akbar Rahman, Montreal (CA)

(73) Assignee: Interdigital Technology Corporation, Wilmington, DE (US)

( * ) Notice: Subject to any disclaimer, the term of this patent is extended or adjusted under 35 U.S.C. 154(b) by 839 days.

(21) Appl. No.: 11/558,260

(22) Filed: Nov. 9, 2006

(65) Prior Publication Data

US 2007/0174443 A1 Jul. 26, 2007

Related U.S. Application Data

(60) Provisional application No. 60/735,442, filed on Nov. 12, 2005, provisional application No. 60/825,677, filed on Sep. 14, 2006.

(51) Int. Cl.
*H04W 4/00* (2009.01)
(52) U.S. Cl.
USPC ............... 455/435.1; 709/220; 709/223
(58) Field of Classification Search
USPC ............ 455/435, 435.1, 435.2; 709/221, 709/220, 223
See application file for complete search history.

(56) References Cited

U.S. PATENT DOCUMENTS

| 6,788,676 | B2 * | 9/2004 | Partanen et al. | 370/352 |
| 7,395,336 | B1 * | 7/2008 | Santharam et al. | 709/227 |
| 2002/0131395 | A1 * | 9/2002 | Wang | 370/349 |
| 2002/0196760 | A1 * | 12/2002 | Malomsoky et al. | 370/338 |
| 2003/0046404 | A1 * | 3/2003 | O'Neill et al. | 709/228 |
| 2004/0043756 | A1 * | 3/2004 | Haukka et al. | 455/411 |
| 2004/0139201 | A1 * | 7/2004 | Chaudhary et al. | 709/229 |
| 2004/0162892 | A1 * | 8/2004 | Hsu | 709/221 |
| 2004/0266387 | A1 * | 12/2004 | Matusz | 455/403 |
| 2005/0070334 | A1 * | 3/2005 | Ono et al. | 455/566 |
| 2005/0163089 | A1 * | 7/2005 | Purkayastha et al. | 370/338 |
| 2005/0281216 | A1 * | 12/2005 | Varonen et al. | 370/328 |
| 2006/0198334 | A1 * | 9/2006 | Civanlar et al. | 370/328 |
| 2006/0253873 | A1 * | 11/2006 | Lim et al. | 725/62 |
| 2007/0049314 | A1 * | 3/2007 | Balachandran et al. | 455/518 |
| 2007/0076608 | A1 * | 4/2007 | Samuel et al. | 370/230 |

(Continued)

FOREIGN PATENT DOCUMENTS

GB 2394381 * 4/2004

OTHER PUBLICATIONS

3GPP, 3rd Generation Partnership Project; Technical Specification Group Services and System Aspects; *IP Multimedia Subsystem (IMS)*; Stage 2 (Release 7), 3GPP TS 23.228 V7.1.0, (Sep. 2005).

(Continued)

*Primary Examiner* — Olumide T Ajibade Akonai
*Assistant Examiner* — Edward Zhang
(74) *Attorney, Agent, or Firm* — Volpe and Koenig, P.C.

(57) ABSTRACT

Method and apparatus for attaching an IMS enabled wireless transmit/receive unit (WTRU) to a long term evolution (LTE) wireless network. With one attach request, the WTRU registers and authenticates itself to the network, obtains an IP address allocation, and SIP registration.

12 Claims, 5 Drawing Sheets

(56) References Cited

U.S. PATENT DOCUMENTS

2007/0113086 A1* 5/2007 Huang et al. .................. 713/168
2007/0214224 A1* 9/2007 Nam et al. .................... 709/206
2009/0303971 A1* 12/2009 Kim et al. ..................... 370/338

OTHER PUBLICATIONS

3GPP, 3rd Generation Partnership Project; Technical Specification Group Services and System Aspects; *3G Security; Access Security For IP-Based Services* (Release 7), 3GPP TS 33.20. V6.8.0, (Sep. 2005).

3GPP, 3rd Generation Partnership Project; Technical Specification Group Core Network and Terminals; Mobile RAdio Interface Layer 3 Specification; Core Network Protocols; Stage 3 (Release 7), 3GPP TS 24.008 V7.1.0 (Sep. 2005).

Ericsson, *Proposal on an Extended Attach Procedure*, 3GPP TSG SA WG2 Architecture—Adhoc, S2H050238 (Rev of Corrupted S2H050192), (Seattle, Washington Oct. 11-14, 2005).

Nokia, *Technologies for UTRAN Long Term Evolution* Nov. 2-3, 2004, UTRAN Long Term Evolution Workshop, (Tronto, Canada Nov. 2-3, 2004).

Rosenberg et al., *SIP: Session Initiation Protocol, Network Working Group*, IETF RFC 3261, (Jun. 2002).

* cited by examiner

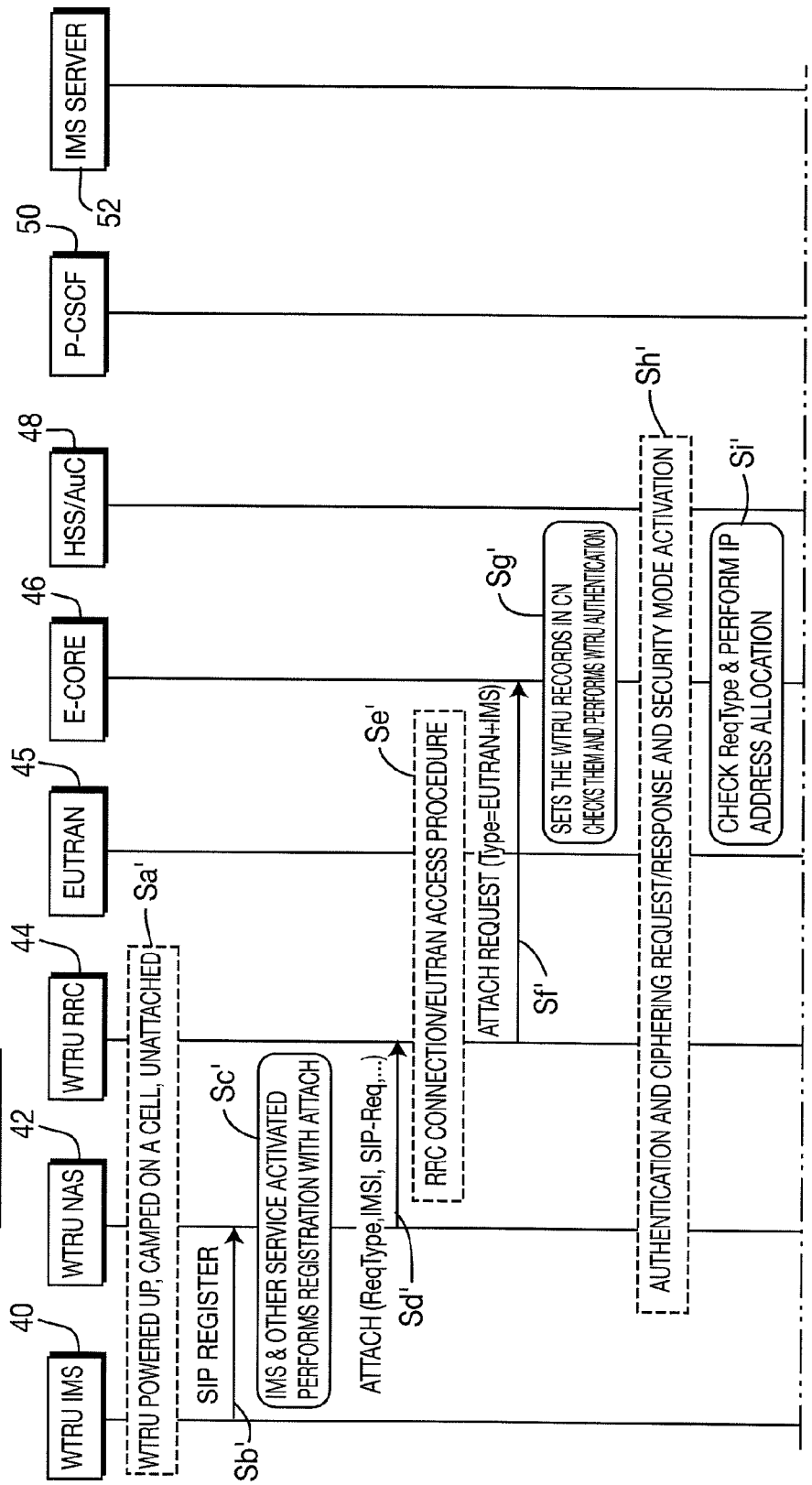

| 8 | 7 | 6 | 5 | 4 | 3 | 2 | 1 | |
|---|---|---|---|---|---|---|---|---|
| ATTACH TYPE |E| | | | | FOR | TYPE OF ATTACH | | | OCTET 1 |

| TYPE OF ATTACH (OCTET 1, BIT 1 TO 3) |
|---|
| BITS |
| 3 2 1 |
| 0 0 1   GPRS ATTACH |
| 0 1 0   NOT USED. THIS VALUE WAS ALLOCATED IN EARLIER VERSIONS OF THE PROTOCOL (NOTE 1) |
| 0 1 1   COMBINED GPRS/IMS ATTACH |
| 1 0 0   EUTRAN/HSPA+ ATTACH & SIP REGISTER |
| |
| ALL OTHER VALUES ARE INTERPRETED AS GPRS ATTACH IN THIS VERSION OF THE PROTOCOL. |
| |
| FOLLOW-ON REQUEST (OCTET 1, BIT 4) |
| BITS |
| 4 |
| 0   NO FOLLOW-ON REQUEST PENDING |
| 1   FOLLOW-ON REQUEST PENDING |
| FOLLOW-ON REQUEST PENDING IS APPLICABLE ONLY IN Iu MODE. |
| NOTE 1: THE CODE POINT "010" IF RECEIVED BY THE NETWORK, IT SHALL BE INTERPRETED AS "COMBINED GPRS/IMSI ATTACH". |
| NOTE 2: THE CODE POINT "100" SHALL BE INTERPRETED BY THE NETWORK AS "SIMULTANEOUS ATTACH, IP ALLOCATION AND SIP REGISTER". |

*FIG. 4*

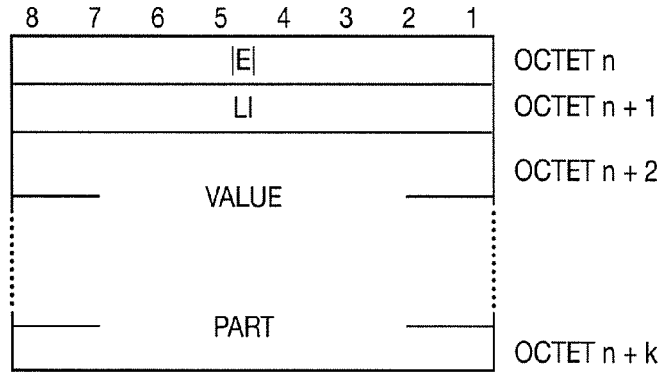

*FIG. 5*

IMS ENABLED ATTACH PROCEDURE FOR LTE

CROSS REFERENCE TO RELATED APPLICATION

This application claims priority from U.S. Provisional Patent Applications No. 60/735,442, filed Nov. 12, 2005 and No. 60/825,677, filed Sep. 14, 2006, which are incorporated by reference as if fully set forth.

FIELD OF THE INVENTION

This invention relates to a procedure for an Internet Multimedia System (IMS) enabled wireless transmit/receive unit (WTRU) to register itself to access and core networks and to the 3GPP Long Term Evolution (LTE) Enhanced UTRAN (EUTRAN), Enhanced Core (E-Core) Network and the IMS network system (IMS) and to obtain WTRU authentication, IP address allocation and Session Initiation Protocol (SIP) registration, and more particularly, to accomplish this in an efficient one-step ATTACH operation.

With the procedure set forth herein, the WTRU is able to achieve the ability to receive immediate incoming IMS calls and to perform faster outgoing call setup with the IMS network.

BACKGROUND

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The 3GPP has lately initiated the Long Term Evolution (LTE) program to bring new technology, new network architecture and configuration and new applications and services to the wireless cellular network in order to provide improved spectral efficiency, reduced latency, faster user experiences and richer applications and services at less cost.

With the advances of both wireless technology and internet technology, the integration of these two technologies and applications are the focus of the telecom industry. Given that the Internet Multimedia System (IMS) has already been specified, designed and implemented, tighter integration of the IMS into the current 3GPP and the future LTE takes on even greater importance. It is foreseeable that in the LTE network, WTRUs will be equipped with the IMS software and hardware and need to be a part of the system normal operation, including system initiation and registration.

It has been proposed for the LTE project that to reduce end-user latency, user and control plane separation in the Radio Access Network (RAN) should be implemented to optimize routing of user-plane and control-plane data. Similar concepts are applicable to Evolved High Speed Packet Access (HSPA) systems.

In current wireless telecommunication systems, when a WTRU switches on from the power-off state and gets camped with a cell, the WTRU will register itself to the network to obtain the subscribed services. This step is usually referred to as the ATTACH procedure, where the WTRU gets authenticated by the network and the network is updated as to where the WTRU is located. Subsequently, the WTRU is able to invoke outgoing calls and receive incoming calls via paging. Recently, this ATTACH procedure is even able to obtain an IP address for the mobile device, whereby direct dialog with another internet device is made possible by the extended ATTACH procedure.

However, this extended ATTACH procedure has not provided help for the prevailing IMS service, For any IMS enabled mobile device, additional steps/procedures beyond the ATTACH procedure are still required to make the mobile device IMS serviceable. As will be set forth below in the description of FIG. 1A, there is no provision for SIP Registration, which has to be performed after, and independently of, the extended ATTACH procedure, thereby preventing immediate use of the IMS service by the WTRU.

Without the SIP registration, the mobile device is further unable to receive incoming IMS (VoIP) calls and cannot set up any outgoing calls until the SIP Registration and IMS authentication is successfully completed.

Currently there is no specified approach for performing SIP Registration in synchronism with the completion of the ATTACH procedure, the result being that SIP Registration and subsequent IMS authentication are neither immediately nor automatically performed after the ATTACH procedure.

The inability to make IMS service available upon power up is due to the separation of the WTRU ATTACH procedure, shown in FIG. 1A, from the WTRU IMS SIP Registration, shown in FIG. 1B. On the user equipment side, the IMS SIP Registration is not part of the initial ATTACH procedure to attach the WTRU to the network. Also, the SIP Registration, as per the current WTRU ATTACH procedure, must await completion of the ATTACH procedure. In addition, the SIP Registration is not specified to immediately follow completion of the ATTACH procedure.

Considering all of the above, the IMS service cannot be used immediately after the WTRU powers up and users may have longer waiting times before the IMS service is ready for use. The separation of the SIP Registration and the ATTACH procedure also increases the number of signaling messages traveling between the WTRU and the E-Core, adding unnecessary network traffic load, both over the air and on landlines.

BRIEF DESCRIPTION OF THE DRAWINGS

FIGS. 2A and 2B, taken together in the manner shown in FIG. 2, show a signaling diagram of an IMS enabled WTRU ATTACH procedure.

FIG. 4 is a bit allocation chart for an enhanced ATTACH REQUEST message for IMS SIP registration.

FIG. 5 shows an encapsulated SIP message within a Type 4 Information Element (IE).

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

This invention provides a one-step ATTACH procedure to the LTE network with a system approach such that, when the WTRU powers up and performs the WTRU registration with the ATTACH procedure, it also performs the mission for IMS SIP Registration. At the completion of the ATTACH procedure, the WTRU is authenticated, its IP address is allocated and the IMS service is enabled via the SIP Registration, which is performed with the ATTACH procedure.

SIP registration is carried out by the ATTACH procedure at about the same time that the Enhanced Core (E-Core) Network is performing the ATTACH ACCEPT step. Providing parallel steps save the time otherwise needed for a subsequent IMS SIP registration, and also enables the ATTACH procedure to complete service registration together with mobile device registration.

Figure 1A:
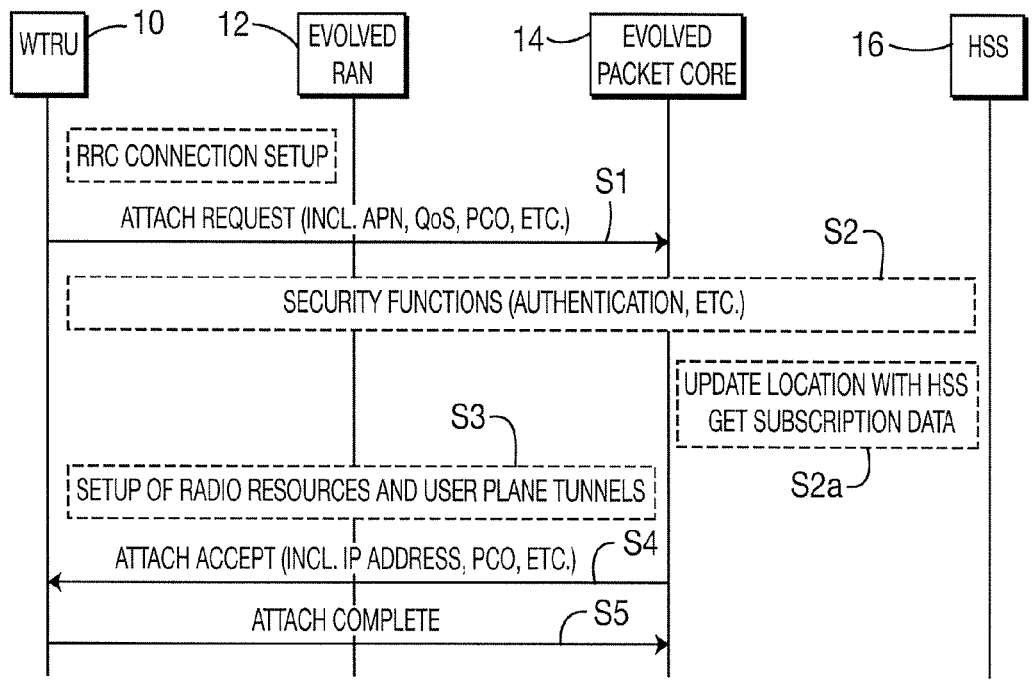
FIGS. 1A and 1B respectively show signaling diagrams of a WTRU ATTACH procedure and an SIP registration procedure.

As can be seen from FIG. 1A, the Attach request step S1 is conveyed to the Evolved Packet Core 14 from WTRU 10 through the Evolved Radio Access Network (RAN) 12, including Access Point Name (APN), Quality of Service (QoS), Protocol Configuration Options (PCO), etc. At S2, security functions are then performed, employing the Home Subscriber Server (HSS) 16 to update the WTRU's location and obtain subscription data, at S2a. Radio resources are set up between core 14 and WTRU 10, at S3, resulting in the Attach Accept, S4, which includes providing the IP address, Protocol Configuration Options (PCO) and the like; and finally Attach complete, at S5.

Figure 1B:
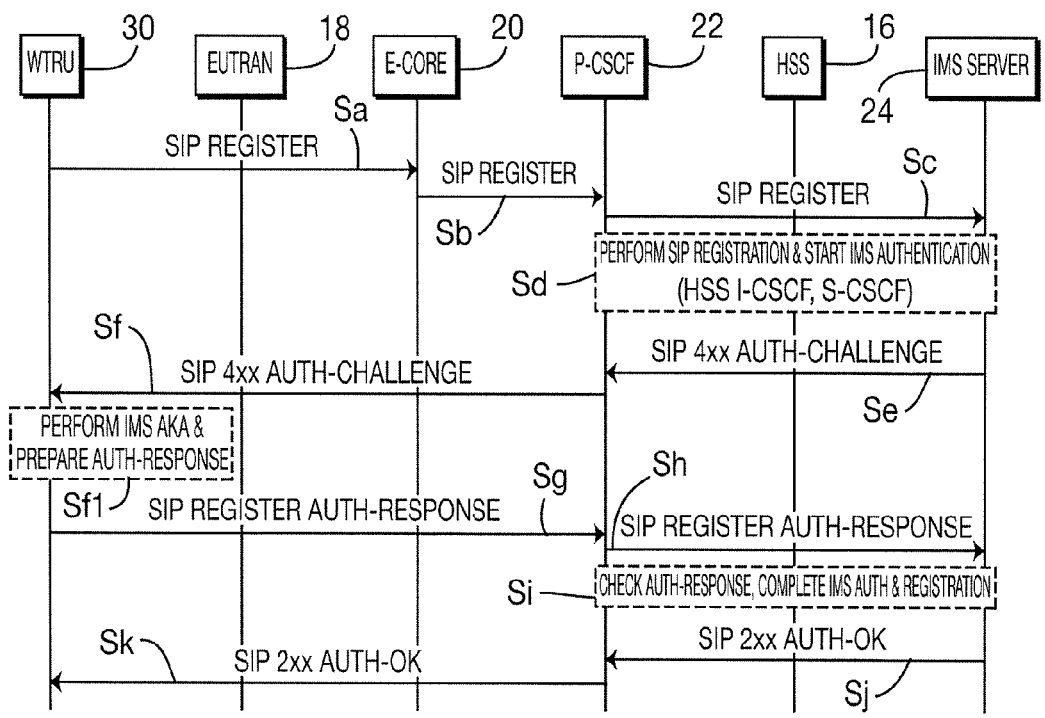

FIG. 1B shows the SIP registration procedure, the SIP Register being conveyed from WTRU 30 to E-Core 20, at step Sa, to the Proxy Call Session Control Function (P-CSCF) 22 at Sb and to the IMS server 24 at Sc. Registration and authentication is performed at Sd, and SIP Authorization Challenge is conveyed to P-CSCF 22 at Se, and WTRU 30 at Sf, which performs IMS Authentication and Key Agreement (AKA) and prepares the Authorization response at Sg. The SIP Register Authorization response is conveyed from WTRU 30 to P-CSCF 22 at Sg and then to IMS Server 24 at Sh. IMS Server 24 checks the Authorization response, completes the IMS authorization and registration at Si and conveys the SIP Authorization OK to P-CSCF 22 at Sj and to WTRU 30 at Sk, completing SIP registration. It can be seen that the procedures in FIGS. 1A and 1B are independent of one another and there is no automatic triggering of the SIP procedure from the Attach procedure.

Figure 2B:
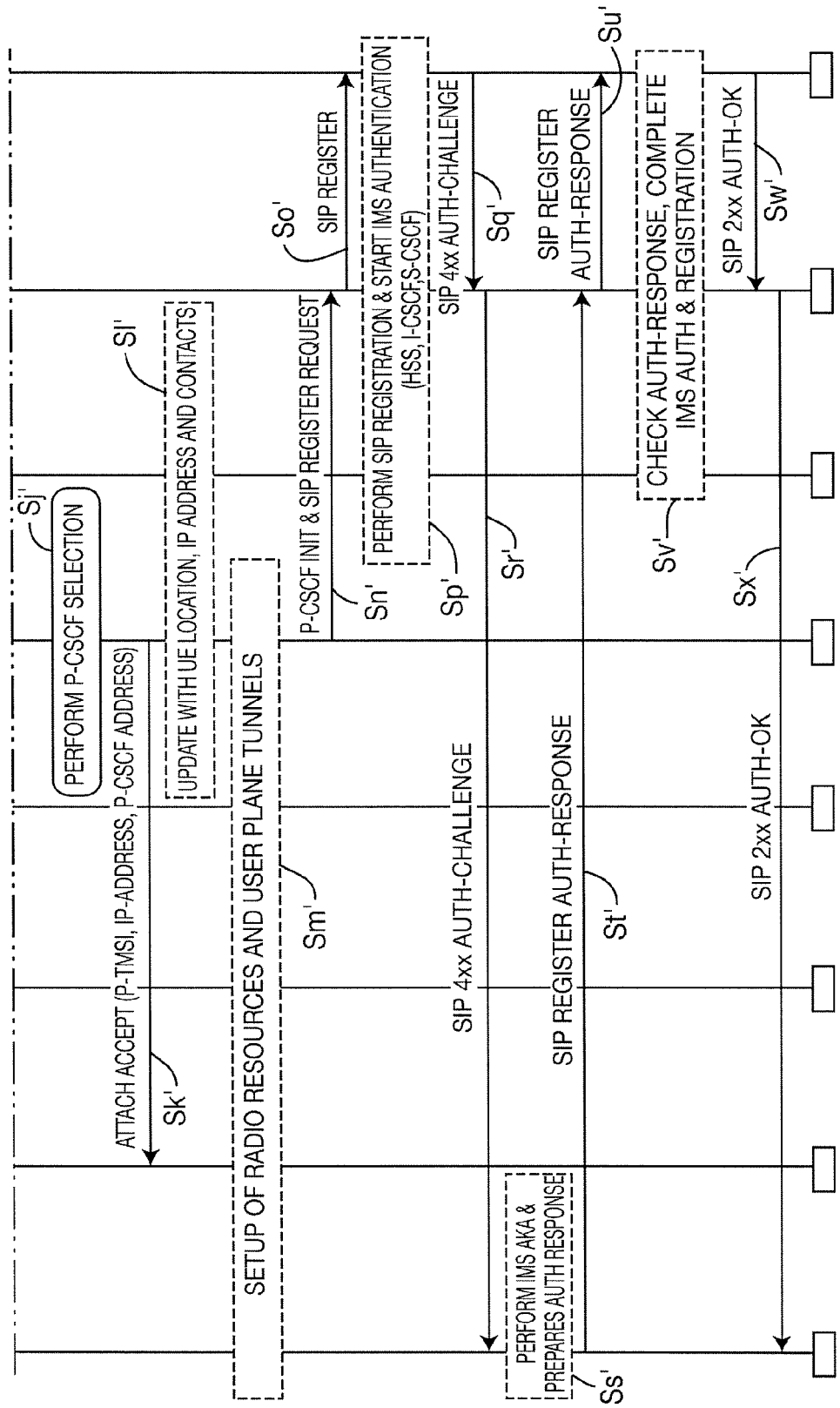

FIGS. 2A and 2B, taken together, show the system coordination for the enhanced one-step ATTACH procedure with SIP Registration. SIP registration is carried out by the ATTACH at about the same time that the E-Core Network performs the ATTACH ACCEPT step. The following are the steps of the IMS Enabled ATTACH procedure as shown in FIGS. 2A and 2B.

The IMS capable WTRU 40, is unattached and powers up at Sa' and is camped on a cell, whereupon the WTRU 40 prepares for the registration to the network, at Sb', which, at Sc', includes the activation of the equipped network services the WTRU 40 subscribes to, IMS in particular. The IMS Stack component SIP also initiates the SIP Registration request to the WTRU Non-Access Stratum (NAS) 42. The WTRU NAS 42 conveys the ATTACH procedure at Sd' as well as the SIP registration request if it is an IMS enabled WTRU, during the MM-IMS Initial Synchronization procedure shown in FIG. 3 and described below in detail.

The WTRU NAS ATTACH procedure, by way of WTRU Radio Resource Control (RRC) 44, constructs the ATTACH REQUEST message at Se', which includes the SIP Registration information element, and formats the appropriate ATTACH Request Type (EUTRAN+IMS), to indicate to the network that this is an enhanced ATTACH REQUEST message that requests the E-Core 46 and the IMS Proxy server (P-CSCF) 50 and IMS Server 52 that SIP registration service be performed. The ATTACH REQUEST message, at Sf', is transported over the signaling link of the RRC Connection 44 by an RRC message (Initial Direct Transfer).

When E-Core 46 receives the enhanced ATTACH REQUEST message, E-Core 46, at Sg', looks at the WTRU credentials in the message and performs the usual WTRU authentication with the HSS/AuC 48, which involves the exchange of AUTHENTICATION REQUEST and AUTHENTICATION RESPONSE messages between the WTRU and the E-Core 46 and security mode activation messages between the EUTRAN 45 and the WTRU 40, as shown at Sh'. At Si' E-Core 46 further checks the request type and performs IP address allocation. For the enhanced ATTACH REQUEST attach type EUTRAN+IMS, the enhanced ATTACH procedure in E-Core 46, at Sj', performs the Proxy Call Session Control Function (P-CSCF) address selection for selecting the IMS Proxy and, at Sk' sends the ATTACH ACCEPT message to the WTRU NAS 42 of WTRU 40 with the chosen P-CSCF address, as well as the IP address and the P-TMSI. E-Core 46 and HSS/AuC 48 interface to update the WTRU location, IP address and contacts at Sl'. The ATTACH ACCEPT message also triggers the establishment of the user plane tunnels to the WTRU IMS with appropriate radio bearer support setup, at Sm'.

For the ATTACH REQUEST attach type EUTRAN+IMS, the enhanced E-Core 46 ATTACH procedure, at Sn', sends to the chosen Proxy server 50 the "P-CSCF Initiate and SIP Registration Request" to start the SIP registration, the P-CSCF 50 forwarding the SIP Request to IMS server 52 at So'.

The SIP registration and its related actions for the particular IMS-enabled WTRU 40 are carried out among the HSS 48, P-CSCF 50 and the IMS server (I-CSCF and S-CSCF) 52, at Sp'. WTRU IMS authentication parameters and Authentication Vectors are retrieved from the HSS 48, one of them being selected to be sent to the WTRU IMS 40 for the Authentication Challenge via an SIP 4xx Auth-Challenge message, Sq', to P-CSCF 50.

P-CSCF 50, at Sr' sends the SIP 4xx Auth-Challenge message to WTRU IMS 40 via E-Core 46 over an established user plane tunnel. Prior to this, the WTRU NAS 42 has received the ATTACH ACCEPT message, Sk' from E-Core 46 which also forwards the P-CSCF address to the IMS stack. This P-CSCF address becomes the future destination of the SIP messages.

The WTRU IMS 40 receives the SIP 4xx Auth-Challenge message Sr' and, at Ss', performs the IMS authentication AKA (Authentication and Key Agreement) procedure, generating the security keys and the authentication response to the network. The SIP register authentication response St' is sent via P-CSCF 50 to the IMS server 52 identified in the SIP Register Auth-Response message, at Su'.

The IMS server 52 (S-CSCF), at Sv', checks the WTRU Authentication response and determines the authentication is a success (or a failure) and completes the registration of IMS-enabled WTRU 40 with HSS 48. IMS server 52 sends the SIP 2xx Auth-OK message Sw' to P-CSCF 50, which sends the message to WTRU 40, at Sx'.

Receipt of the SIP 2xx Auth-OK message provides notice to WTRU 40 that both the SIP Registration and authentication are successful. The enhanced ATTACH procedure of the WTRU is completed, the IMS is registered and authenticated with the network and the WTRU is now ready for any incoming IMS/VoIP call and is further ready for any outgoing call setup as well.

Figure 3:
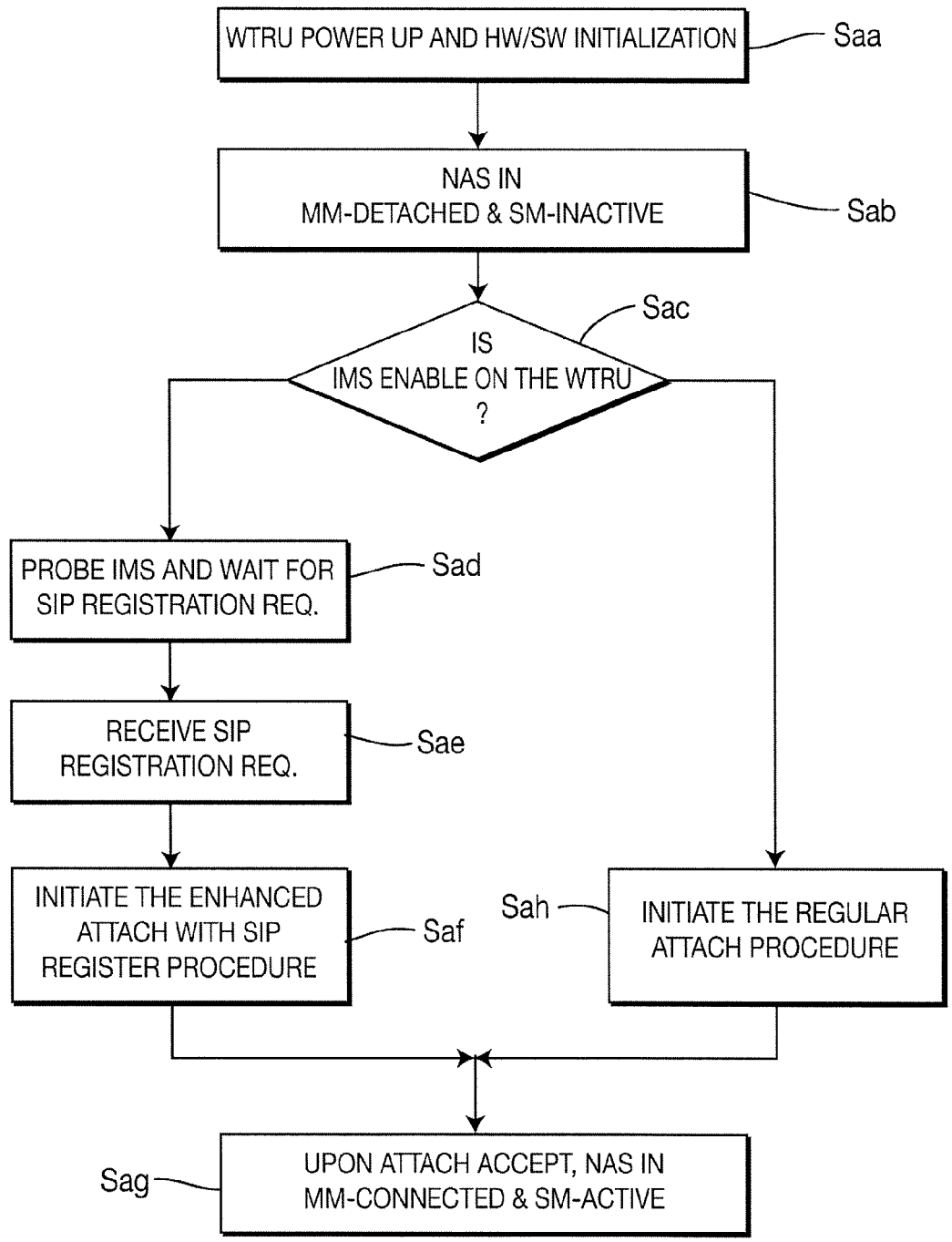
FIG. 3 is a flow diagram of a WTRU MM (Mobile Management)-IMS synchronization procedure.

FIG. 3 is a flowchart of Logical Procedures for a WTRU Mobile Management (MM)-IMS Initial Synchronization. The WTRU performs power-up, at Saa, and, at Sab, determining the MM to be detached and SM to be inactive, and, if UE IMS is enabled, branches to Sad, whereby the Mobility Management/GPRS Mobility Management (MM/GMM) entity, at Sad, queries the IMS service Hardware and Software (HW and SW) availability status and requests the IMS stack component (SIP) for its registration with the network.

The IMS/SIP entity, at Sae, obtains the relevant parameters from the USIM/ISIM to form a SIP Register Request message to the MM/GMM. When the MM/GMM receives the SIP Register request, it formats and sends the enhanced ATTACH REQUEST message to the network, at Saf, to register the WTRU and its IMS service at the same time. This enhanced ATTACH procedure ends with the reception of the ATTACH ACCEPT message, at Sag to place WTRU NAS in the MM-connected and SM-Active state.

Returning to step Sac, in the event that IMS is not enabled, the regular ATTACH procedure is initiated, at Sah, followed by reaction to the ATTACH ACCEPT as shown at Sag and described above.

Enhancements to the ATTACH REQUEST message are based on the following message content table shown in Table 1 and the terms are described according to 3GPP TS24.008, the Mobile radio interface Layer 3 (L3) specification, Core Network Protocols.

Abbreviations in Table 1 above relevant to the present invention are: M=mandatory; TV=type & value; TLV=type, length & value; IE=Information Element; IEI=Information Element Identifier. Other abbreviations include: Packet Switch Location Service Capability (PS LSC); Temporary Mobile Subscriber Identity (TMSI); International Mobile Subscriber Identity (IMSI); Discontinuous Reception (DRX).

The addition of the IMS SIP Registration IE enables the enhanced ATTACH REQUEST message to carry out the IMS SIP registration task as well as the typical functions of the ATTACH procedure.

FIG. 4 shows a bit allocation chart for a new ATTACH type EUTRAN+IMS or evolved HSPA+IMS which is provided herein for the enhanced ATTACH REQUEST to the LTE E-Core ATTACH procedure with IMS SIP Registration implied. This ATTACH type applies to the Combined ATTACH Request procedure as well.

The IMS SIP Registration IE may be either one of the following:
  a. An encapsulated SIP Register message—This approach provides the transparency of upper layer service protocol message to the current MM entities, freeing the SIP rebuilding task of the network element.
  b. A condensed message element that is a minimum required for the SIP Registration for a shorter ATTACH REQUEST message.
  Table 2 shows the IMS SIP Registration IE provided as a Higher Layer Signaling Message.
  The Encapsulated SIP message as an IE is a Type-4 IE (per 24.007) as illustrated in FIG. 5.

TABLE 2

| IEI | Information Element | Type/Reference | Presence | Format | Length |
|-----|--------------------|-----------------|----------|--------|--------|
| XX  | IMS SIP Registration | HigherLayerSignalingMessage 10.5.xx.xx | M | TLV | |

In FIG. 5, IEI is an ID (to be determined by 3G WG) indicating it is an encapsulated SIP message, LI is the length indicator for the value part and the value part contains the SIP message in full from the IMS stack.

The purpose of the IMS SIP Register IE information element is to provide IMS SIP registration together with the

TABLE 1

| | 3GPP TS 24.008: ATTACH REQUEST message content | | | | |
|---|---|---|---|---|---|
| IEI | Information Element | Type/Reference | Presence | Format | Length |
| | Protocol discriminator | Protocol discriminator 10.2 | M | V | 1/2 |
| | Skip indicator | Skip indicator 10.3.1 | M | V | 1/2 |
| | Attach request message identity | Message type 10.4 | M | V | 1 |
| | MS network capability | MS network capability 10.5.5.12 | M | LV | 3-9 |
| | Attach type | Attach type 10.5.5.2 | M | V | 1/2 |
| | GPRS ciphering key sequence number | Ciphering key sequence number 10.5.1.2 | M | V | 1/2 |
| | DRX parameter | DRX parameter 10.5.5.6 | M | V | 2 |
| | P-TMSI or IMSI | Mobile identity 10.5.1.4 | M | LV | 6-9 |
| | Old routing area identification | Routing area identification 10.5.5.15 | M | V | 6 |
| | MS Radio Access capability | MS Radio Access capability 10.5.5.12a | M | LV | 6-52 |
| 19 | Old P-TMSI signature | P-TMSI signature 10.5.5.8 | O | TV | 4 |
| 17 | Requested READY timer value | GPRS Timer 10.5.7.3 | O | TV | 2 |
| 9- | TMSI status | TMSI status 10.5.5.4 | O | TV | 1 |
| 33 | PS LCS Capability | PS LCS Capability 10.5.5.22 | O | TLV | 3 |
| ?? | IMS SIP Registration | IMS SIP Registration 10.5.xx.xx | O | TLV | ? |

ATTACH REQUEST. This is an optional IE for those WTRUs that are equipped with IMS capability and are subscribers to the IMS service.

Table 3 below provides the proposed SIP Registration parameters based on the following specification: IETF RFC 3261, RFC 3261-SIP Session Initiation Protocol, IETF networking Group, June 2002.

The private and public user identities for IMS authentication IMS User Private Identity (IMPI) and IMS User Public Identity (IMPU) are according to the following 3GPP specifications:
- 3GPP TS 33.203, 3G Security; Access Security for IP-based services, V6.8.0
- 3GPP TS 23.228, IP Multimedia Subsystem: Stage 2, V7.1.0.

Table 5, below, relates to the ATTACH result information element (IE). This IE in the ATTACH ACCEPT message indicates the result of the WTRU registration via the ATTACH REQUEST. Two new result values are added: EUTRAN/HSPA+ indicates the successful WTRU authentication and IP address allocation; the result of EUTRAN/HSPA+ +IMS indicates the successful WTRU authentication, IP address allocation and IMS Proxy location.

TABLE 5

3GPP TS 24.008: Attach result information element

Result of attach (octet 1)
Bits
3  2  1

TABLE 3

| IEI | Information Element | Type/Reference | Presence | Format | Length |
|---|---|---|---|---|---|
|  | Request-URI | SIP-Request-URI 10.5.xx.xx | M | LV |  |
|  | From | SIP-From 10.5.xx.xx | M | LV |  |
|  | To | Sip-To 10.5.xx.xx | M | LV |  |
|  | Call-Id | SIP-Call-Id 10.5.xx.xx | M | LV |  |
|  | Cseq | SIP-Cseq 10.5.xx.xx | M | LV |  |
|  | PrivateUserIdentity | SIP-Register-IMPI 10.5.xx.xx | M | LV |  |
|  | PublicUserIdentity | SIP-Register-IMPU 10.5.xx.xx | M | LV |  |
| XX | Expire | SIP-Expire 10.5.xx.xx | O | TV | 5 |

A new, enhanced ATTACH ACCEPT message set forth herein brings the allocated IP address and the chosen P-CSCF address back to the WTRU. Table 4 below shows ATTACH ACCEPT message content.

TABLE 4

3GPP TS 24.008: ATTACH ACCEPT message content

| IEI | Information Element | Type/Reference | Presence | Format | Length |
|---|---|---|---|---|---|
|  | Protocol discriminator | Protocol discriminator 10.2 | M | V | 1/2 |
|  | Skip indicator | Skip indicator 10.3.1 | M | V | 1/2 |
|  | Attach accept message identity | Message type 10.4 | M | V | 1 |
|  | Attach result | Attach result 10.5.5.1 | M | V | 1/2 |
|  | Force to standby | Force to standby 10.5.5.7 | M | V | 1/2 |
|  | Periodic RA update timer | GPRS Timer 10.5.7.3 | M | V | 1 |
|  | Radio priority for SMS | Radio priority 10.5.7.2 | M | V | 1/2 |
|  | Radio priority for TOM8 | Radio priority 2 10.5.7.5 | M | V | 1/2 |
|  | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
|  | Allocated PDP Address | Packet Data Protocol Address 10.5.6.4 | O | IV | 3-19 |
| XX | IMS Proxy Address | P-CSCF Address or <Packet Data Protocol Address> 10.5.xx.xx or <10.5.6.4> | O | ? | ? |

TABLE 5-continued

3GPP TS 24.008: Attach result information element

| 0 | 0 | 1 | GPRS only attached |
|---|---|---|---|
| 0 | 1 | 1 | Combined GPRS/IMSI attached |
| 0 | 1 | 0 | EUTRAN (ATTACH + IP Address Allocation) |
| 1 | 0 | 0 | EUTRAN + 30 IMS (ATTACH + IP Address Allocation + IMS Proxy) |

All other values are reserved.
Follow-on proceed (octet 1)
Bit
4
0            Follow-on proceed
1            No follow-on proceed
Follow-on proceed is applicable only in Iu mode. This indication shall be ignored if received in A/Gb mode.

The above method may be implemented in a WTRU acting in a wireless network, preferably a 3GPP LTE type network (OFDM) and by the 3G-UMTS-R7 (HSPA) network as well as an HSPA+ network, at the network layer, transport layer and application layer, as software or a system procedure. This invention applies to WCDMA, TDD, TD-SCDMA high chip rate, and FDD air interfaces and hence is air interface independent.

What is claimed is:

1. A method performed by an internet protocol (IP) multimedia subsystem (IMS) enabled wireless transmit/receive unit (WTRU), the method comprising:
on a condition that the WTRU is powered up and unattached, activating IMS network services before performing a registration of the WTRU with a network using an ATTACH procedure, wherein the ATTACH procedure includes transmitting an attach request message including an IMS session initiation protocol (SIP) Registration Request; and
receiving an ATTACH ACCEPT information element that includes at least one of a private user identity and a public user identity for IMS authentication and an authentication message including both authentication of the WTRU and authentication of an IMS service requested by the WTRU via the IMS SIP Registration Request.

2. The method of claim 1, wherein the WTRU is configured to communicate with a 3GPP long term evolution (LTE) network and the method further comprises:
sending the attach request message to an enhanced UTRAN (EUTRAN), and an enhanced core (E-core) network.

3. The method of claim 1, wherein the attach request message includes an Attach Type information element, the Attach Type information element allowing the WTRU to attach to the network, allocate an IP address and obtain a SIP registration.

4. The method of claim 1, wherein the IMS SIP Registration Request is an IMS SIP Registration information element (IE).

5. The method of claim 4, further comprising:
encapsulating the IMS SIP Registration IE as a SIP Register messages.

6. The method of claim 5, further comprising:
including in the encapsulated SIP Register message an information element identifier (IEI) indicating that it is encapsulated, and a length indicator indicating a length of a value part of the information element, and the value part containing the entire SIP Register message.

7. The method of claim 4, further comprising:
providing as the IMS SIP Registration IE a condensed message element that is of a minimum required length for SIP Registration.

8. The method of claim 1, further comprising:
receiving an ATTACH ACCEPT information element (IE) including an allocated IP address and a chosen Proxy Call Session Control Function (P-CSCF) address responsive to the attach request message.

9. The method of claim 8, wherein the ATTACH ACCEPT IE includes an EUTRAN/HSPA result indicator that indicates a successful WTRU authentication and IP address allocation.

10. The method of claim 8, wherein the ATTACH ACCEPT IE includes an EUTRANHSPA++IMS indicator that indicates successful WTRU authentication, IP address allocation and IMS Proxy location.

11. The method of claim 1, further comprising:
receiving SIP Registration private and public user identities for IMS authentication that include one or more of the following information elements:
Request-URI;
From;
To;
Call-Id;
Cseq;
PrivateUserIdentity;
PublicUserIdentity; and
Expire.

12. The method of claim 1 further comprising:
providing an attachment including registration to an enhanced UTRAN (E-EUTRAN) and an enhanced core (E-Core) network.

* * * * *